US006188678B1

(12) United States Patent
Prescott

(10) Patent No.: US 6,188,678 B1
(45) Date of Patent: *Feb. 13, 2001

(54) METHOD AND APPARATUS FOR ADAPTIVE CLOSED LOOP POWER CONTROL USING OPEN LOOP MEASUREMENTS

(75) Inventor: Tobin A. Prescott, San Diego, CA (US)

(73) Assignee: Qualcomm Inc., San Diego, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/908,528

(22) Filed: Aug. 7, 1997

(51) Int. Cl.[7] .......................... H04B 7/216; H04B 17/00; H04B 1/00; H04B 7/00
(52) U.S. Cl. ..................... 370/318; 370/335; 370/342; 455/67.1; 455/69
(58) Field of Search ........................... 370/318, 320, 370/335, 342, 331, 332, 333; 375/200, 205; 455/13.4, 67, 69, 126, 522

(56) References Cited

U.S. PATENT DOCUMENTS

| 3,925,782 | 12/1975 | Anderl et al. | 343/178 |
|---|---|---|---|
| 4,112,257 | 9/1978 | Frost | 179/2 EB |

(List continued on next page.)

FOREIGN PATENT DOCUMENTS

| 0682417 | 11/1995 | (EP) | H04B/7/005 |
|---|---|---|---|
| 2268365 | 1/1994 | (GB) | H04B/7/005 |
| 9406218 | 3/1994 | (WO) | H04Q/7/04 |

OTHER PUBLICATIONS

Chang et al., "Adaptive Fuzzy Proportional Integral Power Control for a Cellular CDMA System with Time Delay." IEEE Journal on Selected Areas in Communications, vol. 14, No. 9, Dec. 1, 1996, pp. 1818–1829. XP000639644.

Primary Examiner—Huy D. Vu
Assistant Examiner—M. Phan
(74) Attorney, Agent, or Firm—Gregory D. Ogrod; Sandip S. Minhas

(57) ABSTRACT

A method and apparatus for controlling a parameter associated with a first signal transmitted from a first station to a second station in a communication system monitors a second signal transmitted from the second station to the first station to determine a propagation state associated with the transmitted signals. A loop gain is adjusted based on the propagation state. The loop gain is used to adjust the size of commands used to adjust (i.e., increase or decrease) the parameter being controlled. If the propagation state is a quiescent state, the loop gain is set to one. If the propagation state is an active state, the loop gain is set to some value greater than one thereby increasing the size of the commands used to control the parameter. In a preferred embodiment of the present invention, the controlled parameter is a transmit power level of the first signal.

20 Claims, 11 Drawing Sheets

U.S. PATENT DOCUMENTS

| | | | |
|---|---|---|---|
| 4,123,718 | 10/1978 | Lampert et al. | 325/474 |
| 4,752,967 * | 6/1988 | Bustamante et al. | 455/12 |
| 4,765,753 | 8/1988 | Schmidt | 379/60 |
| 4,777,653 | 10/1988 | Bonnerot | 455/69 |
| 4,811,421 | 3/1989 | Havel et al. | 455/69 |
| 4,868,795 | 9/1989 | McDavid et al. | 367/77 |
| 4,870,689 | 9/1989 | Katsuyama et al. | 455/67 |
| 4,901,307 | 2/1990 | Gilhousen et al. | 370/18 |
| 5,056,109 | 10/1991 | Gilhousen et al. | 375/1 |
| 5,093,840 | 3/1992 | Schilling | 375/1 |
| 5,101,501 | 3/1992 | Gilhousen et al. | 455/33 |
| 5,103,459 | 4/1992 | Gilhousen et al. | 375/1 |
| 5,107,487 | 4/1992 | Vilmur et al. | 370/18 |
| 5,128,965 * | 7/1992 | Henriksson | 375/58 |
| 5,204,876 | 4/1993 | Bruckert et al. | 375/1 |
| 5,220,678 | 6/1993 | Feei | 455/69 |
| 5,245,629 | 9/1993 | Hall | 375/1 |
| 5,257,283 | 10/1993 | Gilhousen et al. | 375/1 |
| 5,265,119 | 11/1993 | Gilhousen et al. | 375/1 |
| 5,267,262 * | 11/1993 | Wheatley, III | 375/1 |
| 5,305,468 * | 4/1994 | Bruckert et al. | 455/69 |
| 5,383,219 | 1/1995 | WHeatley, III et al. | 375/1 |
| 5,390,338 | 2/1995 | Bodin et al. | 455/33.1 |
| 5,450,616 | 9/1995 | Rom | 455/69 |
| 5,465,399 | 11/1995 | Oberholtzer et al. | 455/69 |
| 5,487,180 | 1/1996 | Ohtake | 455/54.1 |
| 5,623,486 * | 4/1997 | Dohi et al. | 370/342 |
| 5,881,367 * | 3/1999 | Calot et al. | 455/69 |

* cited by examiner

REVERSE LINK
CONTROL LOOP

FORWARD LINK
CONTROL LOOP

METHOD AND APPARATUS FOR ADAPTIVE CLOSED LOOP POWER CONTROL USING OPEN LOOP MEASUREMENTS

BACKGROUND OF THE INVENTION

I. Field of the Invention

The present invention relates generally to spread spectrum communication systems, and more particularly, to a method and apparatus for adjusting signal parameters in such systems in the presence of control loop or path delay in detecting signal status and using a controllable element to effect changes in the detected status. The invention further relates to using transmit power as a parameter that is controlled to minimize interference among simultaneously operating transmitters and to maximize the quality of individual communications.

II. Description of the Related Art

A variety of multiple access communication systems and techniques have been developed for transferring information among a large number of system users. However, spread spectrum modulation techniques, such as code division multiple access (CDMA) spread spectrum techniques, provide significant advantages over other modulation schemes, especially when providing service for a large number of communication system users. The use of CDMA techniques in multiple access communication systems is disclosed in U.S. Pat. No. 4,901,307, which issued Feb. 13, 1990, entitled "*Spread Spectrum Multiple Access Communication System Using Satellite Or Terrestrial Repeaters,*" and U.S. patent application Ser. No. 08/368,570, entitled "*Method And Apparatus For Using Full Spectrum Transmitted Power In A Spread Spectrum Communication System For Tracking Individual Recipient Phase Time And Energy,*" both of which are assigned to the assignee of the present invention, and incorporated herein by reference.

These patents disclose communication systems in which a large number of generally mobile or remote system users or subscriber units ("mobile units") employ at least one transceiver to communicate with other mobile units, or users of other connected systems, such as a public telephone switching network. Communication signals are transferred either through satellite repeaters and gateways, or directly to terrestrial base stations (also sometimes referred to as cell-sites or cells).

In CDMA communications, the frequency spectrum can be reused multiple times, thereby permitting an increase in the number of mobile units. The use of CDMA results in a much higher spectral efficiency than can be achieved using other multiple access techniques. However, in order to maximize overall communication system capacity and maintain acceptable levels of mutual interference and signal quality, the transmitted power of signals within the system must be controlled so as to maintain, at a minimum level, the amount of power required for any given communication link. By controlling the transmitted signal power at or near the minimum level, interference with other mobile units is reduced.

In communication systems employing satellites, the communication signals typically experience fading that is characterized as Rician. Accordingly, the received signal consists of a direct component summed with multiple reflected components having Rayleigh fading statistics. The power ratio between the direct component and the reflected components is typically on the order of 6–10 dB, depending upon the characteristics of the mobile unit antenna and the environment in which the mobile unit operates.

In contrast to satellite communication systems, communication signals in terrestrial communication systems typically experience signal fading that typically consists only of the reflected, or Rayleigh, components, without a direct component. Thus, the terrestrial communication signals experience a more severe fading environment that the satellite communication signals where Rician fading is the dominant fading characteristic.

The Rayleigh fading in the terrestrial communication system is caused by the communication signals being reflected from many different features of the physical environment. As a result, a signal arrives almost simultaneously at a mobile unit receiver from many directions with different transmission delays. At the UHF frequency bands usually employed by mobile radio communications including those of cellular mobile telephone systems, significant phase differences in signals traveling on different paths may occur. The possibility for destructive summation of the signals may result in occasional deep fades.

In order to provide a full-duplex channel to allow both directions of a conversation to be simultaneously active, such as provided by the conventional wired telephone system, one frequency band is used for an outbound or forward link, (i.e. transmission from the gateway or cell-site transmitter to the mobile unit receiver), and a different frequency band is utilized for the inbound or reverse link, (i.e. transmission from the mobile unit transmitter to the gateway or cell-site receiver). This frequency band separation allows a mobile unit transmitter and receiver to be active simultaneously without feedback or interference from the transmitter into the receiver.

However, using different frequency bands has significant implications for power control. Using different frequency bands causes multipath fading to be independent processes for the forward and reverse links. Forward link path loss cannot simply be measured and have it assumed that the same path loss is present on the reverse link.

Furthermore, in a cellular mobile telephone system the mobile phone is capable of communications through multiple cell-sites as disclosed in copending U.S. patent application Ser. No. 07/433,030, filed Nov. 7, 1989 entitled "*Method And System For Providing A Soft Handoff In Communications In A CDMA Cellular Telephone System,*" the disclosure of which is incorporated herein by reference. In communications with multiple cell-sites, the mobile unit and cell-sites include a multiple receiver scheme as disclosed in the just mentioned application and further detailed in copending U.S. patent application Ser. No. 07/432,552, also filed Nov. 7, 1989 and entitled "*Diversity Receiver In A CDMA Cellular Telephone System,*" the disclosure of which is also incorporated herein by reference.

One method of power control is to have either the mobile unit or the gateway first measure the power level of a received signal. This power measurement is used, along with a knowledge of transponder downlink transmit power levels for each satellite being used and a knowledge of mobile unit and gateway receiver sensitivity, to estimate path loss for each channel of the mobile unit. Either the base station or the mobile unit transceiver can then determine the appropriate power to be used for signal transmissions to the mobile unit, taking into account the path loss estimate, a transmitted data rate, and a satellite receiver sensitivity. In the case of the mobile unit, a request can be made for more or less power in response to such measurements and determinations. At the same time, the gateway can increase or decrease power in response to such requests, or in response to its own measurements.

The signals transmitted by the mobile unit to the satellite are relayed by the satellite to the gateway and generally on to a communication system control system. The gateway or the control system measures the received signal power from the transmitted signals. The gateway then determines the deviation in the received power level from a minimum which is necessary to maintain the desired level of communications. Preferably, the minimum desired power level is that power level necessary to maintain quality communications while reducing system interference.

The gateway then transmits a power control command signal to the mobile unit so as to adjust or "fine tune" the transmit power of the mobile unit. This command signal is used by the mobile unit to change the transmit power level closer to the minimum level required to maintain the desired communications. As channel conditions change, typically due to motion of the mobile unit, or satellite, the mobile unit responds to the control commands from the gateway to continually adjust the transmit power level so as to maintain a proper power level.

In this configuration, the control commands from the gateway are referred to as power control feedback. The power control feedback from the gateway is generally quite slow due to round trip propagation delays through the satellites. A propagation delay to the satellite from either the mobile unit or the gateway is on the order of 4.7 to 13 ms. This results in a one-way propagation delay (i.e., mobile unit to satellite to gateway or gateway to satellite to mobile unit) of 9.4 to 26 ms for a typical LEO satellite orbit (e.g., approximately 879 miles). Thus, a power control command from the gateway can reach the mobile unit up to 26 ms after it was sent. Likewise, a change in the transmitted power made by the mobile unit in response to the power control command is detected by the gateway up to 26 ms after the change was made.

Thus, a transmit power control command experiences the round trip propagation delay, as well as typical processing delays, before the results of that command can be detected by the measuring unit. Unfortunately, particularly where the propagation delay is large, an adjustment to the transmit power in response to the power control command made by the mobile unit will not occur and be detected by the gateway before the next time the received power is measured at the gateway. This results in another power control command being sent to adjust the transmit power without the benefit of the previous power control command having been implemented. In fact, depending on the propagation delay and the iteration time of the power control loop, several power control commands may be pending or "propagating" before the first power control command is responded to by the mobile unit and the results detected by the gateway. As a result, the transmit power oscillates about a set point in what is referred to as a "limit cycle." That is, the transmit power over- or undershoots from a desired amount due to delays in arrival and implementation of commands.

One possible solution to this problem is to simply increase the iteration time of the power control loop so that it more closely resembles the propagation and processing delays. However, the impact of rapid fading and sudden signal blockages experienced by the communication signals require short iteration times to prevent sudden signal loss. As a result, the transmit power may suddenly, and unnecessarily, be increased, resulting in wasted power and increased system interference.

What is needed is a method and an apparatus that quickly responds to changes in transmit signal power, or other signal parameters, requirements, and counteracts the impact of propagation and processing delays associated with corresponding control commands. It is desirable that such a method and apparatus require little additional complexity, control structure, or protocol changes in the gateways.

SUMMARY OF THE INVENTION

The present invention is directed toward a method and apparatus useful for adjusting signal parameters in a communication system. In particular, the present invention is directed toward a method and apparatus for adjusting transmit power in communication systems, such as those employing satellites, that experience significant signal propagation delays. The present invention counteracts the impact of the propagation delays associated with controlling a power level of a signal transmitted from a first station (such as a gateway) to a second station (such as a mobile unit) by monitoring signals sent from the second station to the first station to determine a propagation state of the transmitted signals. Based on the propagation state, a loop gain is determined. The loop gain is used to adjust the size of the commands that control the power level of the signal transmitted from the first station to the second station. If the propagation state indicates that the communication channel between the second station and the first station is quiescent (i.e., not changing), the loop gain is set to one. If the propagation state indicates that the communication channel between the second station and the first station is active (i.e., changing), the loop gain is set to some value greater than one, thereby adjusting the size of the control commands.

According to one embodiment of the present invention, a state detector determines the propagation state of the communication channel between the second station and the first station. The state detector determines whether the magnitude of the change in the power level of the signals transmitted from the second station to the first station exceeds a threshold for each of a series of consecutive time periods (e.g. loop iterations). If so, the state detector indicates the propagation state as the active state. Otherwise, the state detector indicates the propagation state as the quiescent state.

One feature of the present invention is that signals in a first channel (i.e., those signals transmitted from the first station to the second station) are controlled using signals transmitted in a second channel (i.e., those signals transmitted from the second station to the first station). More particularly, the transmit power level of the signals in the first channel are controlled by monitoring the received power level of the signals in the second channel. Because the first and second channels are partially correlated (especially with respect to fades), a change in the propagation state of a signal in the second channel is assumed to be indicative of a change in propagation state of a signal in the first channel. This assumption permits a control loop to respond to changes in the first channel in significantly less time, as compared with conventional techniques, by adjusting the loop gain.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is particularly suited for use in communications systems employing Low Earth Orbit (LEO) satellites. However, as would be apparent to one skilled in the relevant art, the concept of the present invention can also be applied to satellite systems that are not utilized for communications purposes. The invention is also applicable to satellite systems in which the satellites travel in non-LEO orbits, or to non-satellite repeater systems, if there is sufficiently large propagation delay of the signals.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination, and satellite and terrestrial cellular telephone systems. A preferred application is in CDMA wireless spread spectrum communication systems for mobile or portable telephone service.

Figure 1:
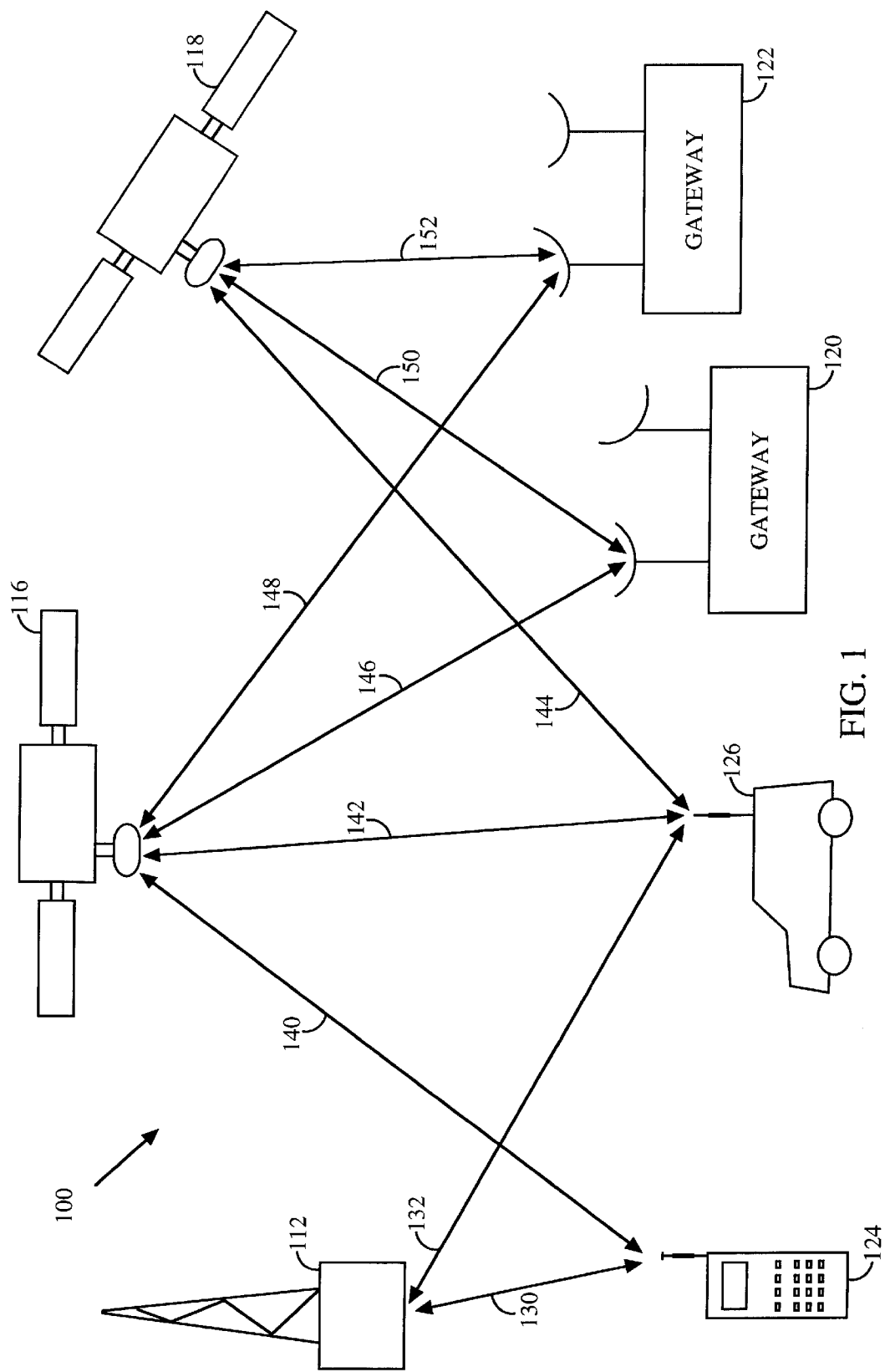
FIG. 1 illustrates a typical wireless communication system in which the present invention is used.

An exemplary wireless communication system in which the present invention is useful, is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with two remote mobile units 124 and 126. Typically, the base stations and satellites/gateways are components of separate communication systems, referred to as being terrestrial and satellite based, although this is not necessary. The total number of base stations, gateways, and satellites in such systems depend on desired system capacity and other factors well understood in the art.

Mobile units 124 and 126 each include a wireless communication device such as, but not limited to, a cellular telephone, a data transceiver or transfer device (e.g., computers, personal data assistants, facsimile), or a paging or position determination receiver, and can be hand-held or vehicle-mounted as desired. Typically, such units are hand-held or vehicle mounted as desired. Here, the mobile units are illustrated as hand-held telephones. However, it is also understood that the teachings of the invention are applicable to fixed units or other types of terminals where remote wireless service is desired, including 'indoor' as well as 'open air' locations.

The terms base station, gateway, hub, and fixed station are sometimes used interchangeably in the art, with gateways generally understood as comprising specialized base stations that direct communications through satellites. Mobile units are also referred to as subscriber units, user terminals, mobile stations, or simply "users," "mobiles," or "subscribers" in some communication systems, depending on preference.

Generally, beams from satellites 116 and 118 cover different geographical areas in predefined patterns. Beams at different frequencies, also referred to as CDMA channels or 'sub-beams,' can be directed to overlap the same region. It is also readily understood by those skilled in the art that beam coverage or service areas for multiple satellites, or cellular base stations, might be designed to overlap completely or partially in a given region depending on the communication system design and the type of service being offered, and whether space diversity is being achieved. For example, each may provide service to different sets of users with different features at different frequencies, or a given mobile unit may use multiple frequencies and/or multiple service providers, each with overlapping geophysical coverage.

A variety of multi-satellite communication systems have been proposed with an exemplary system employing on the order of 48 or more satellites, traveling in eight different orbital planes in LEO orbits for servicing a large number of mobile units. However, those skilled in the art will readily understand how the teachings of the present invention are applicable to a variety of satellite system and gateway configurations, including other orbital distances and constellations. At the same time, the invention is equally applicable to terrestrial-based systems of various base station configurations.

In FIG. 1, some possible signal paths are illustrated for communications being established between mobile units 124 and 126 and base station 112, or through satellites 116 and 118, with gateways 120 and 122. The base station-mobile unit communication links are illustrated by lines 130 and 132. The satellite-mobile unit communication links between satellites 116 and 118, and mobile units 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one or two-way communication systems or simply to transfer messages or data to mobile units 124 and 126.

Figure 2:
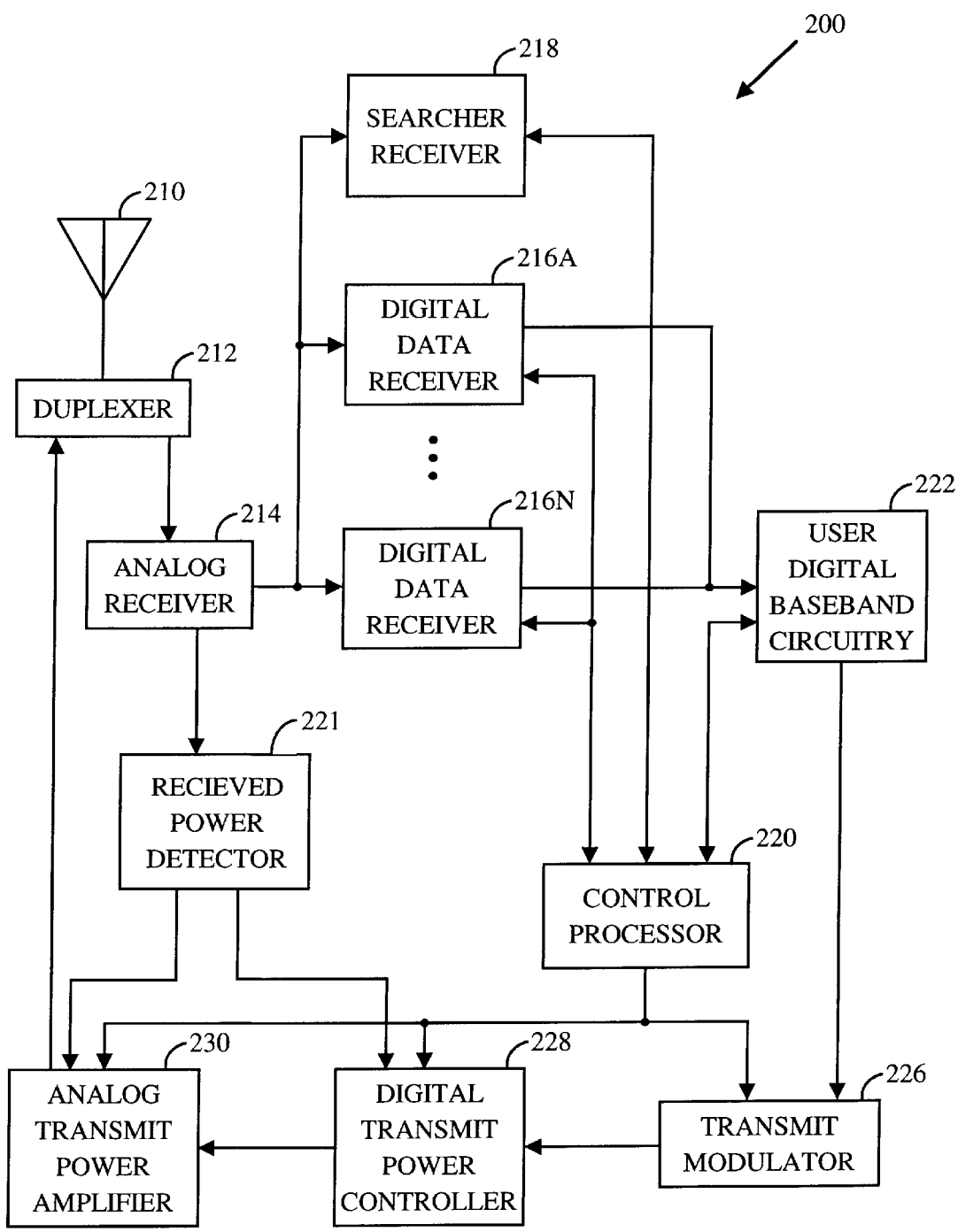
FIG. 2 illustrates an exemplary transceiver apparatus for use by a mobile user.

An exemplary transceiver 200 for use in the mobile units 124 or 126 (as shown in FIG. 1) is illustrated in FIG. 2. Transceiver 200 uses at least one antenna 210 for receiving communication signals which are transferred to an analog receiver 214, where they are downconverted, amplified, and digitized. A duplexer element 212 is typically used to allow the same antenna to serve both transmit and receive functions. However, some systems employ separate antennas for operating at different transmit and receive frequencies.

The digital communication signals output by analog receiver 214 are transferred to at least one digital data receiver 216A and at least one digital searcher receiver 218. Additional digital data receivers 216B–216N can be used to obtain desired levels of signal diversity, depending on the acceptable level of unit complexity, as would be apparent to one skilled in the relevant art.

At least one mobile unit control processor 220 is coupled to digital data receivers 216A–216N and searcher receiver 218. Control processor 220 provides, among other functions, basic signal processing, timing, power and handoff control or coordination, and selection of frequency used for signal carriers. Another basic control function often performed by control processor 220 is the selection or manipulation of PN code sequences or orthogonal functions to be used for processing communication signal waveforms. Signal processing by control processor 220 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 216A–216N are coupled to digital baseband circuitry 222 within the mobile unit. User digital baseband circuitry 222 comprises processing and presentation elements used to transfer information to and from a mobile unit user. That is, signal or data storage elements, such as transient or long term digital memory; input and output devices such as display screens, speakers, keypad terminals, and handsets; A/D elements, vocoders and other voice and analog signal processing elements; etc., all form parts of the user digital baseband circuitry 222 using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communications signal originating with the mobile unit, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

Mobile unit 200 can also employ one or more precorrection elements, as desired, in the transmission path to adjust the frequency of outgoing signals. This can be accomplished using one or a variety of well known techniques. Mobile unit 200 can also employ a precorrection element in the transmission path to adjust the timing of outgoing signals, using well known techniques of adding or subtracting delay in the transmission waveform.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 222. Alternatively, the information can be inserted as predetermined control bits by transmit modulator 226 or transmit power controller 228 under control of control processor 220. See for example U.S. Pat. No. 5,383,219, entitled "Fast Forward Link Power Control In A Code Division Multiple Access System," issued Jan. 17, 1995; U.S. Pat. No. 5,396,516, entitled "Method And System For The Dynamic Modification Of Control Parameters In A Transmitter Power Control System," issued Mar. 7, 1995; and U.S. Pat. No. 5,267,262, entitled "Transmitter Power Control System," issued Nov. 30, 1993.

Analog receiver 214 can provide an output indicating the power or energy in received signals. Alternatively, a received power detector 221 can determined this value by sampling the analog receiver output and performing processing well known in the art. This information can be used directly by transmit power amplifier 230 or transmit power controller 228 to adjust the power of signals transmitted by mobile user 200.

Digital receivers 216A–N and searcher receiver 218 are configured with signal correlation elements to demodulate and track specific signals. Searcher receiver 218 is used to search for pilot signals, or other relatively fixed pattern strong signals, while digital receivers 216A–N are used to demodulate other signals associated with detected pilot signals. Therefore, the outputs of these units can be monitored to determine the energy in, or frequency of, the pilot signal or other signals. These receivers also employ frequency tracking elements that can be monitored to provide current frequency and timing information to control processor 220 for signals being demodulated.

Figure 3:
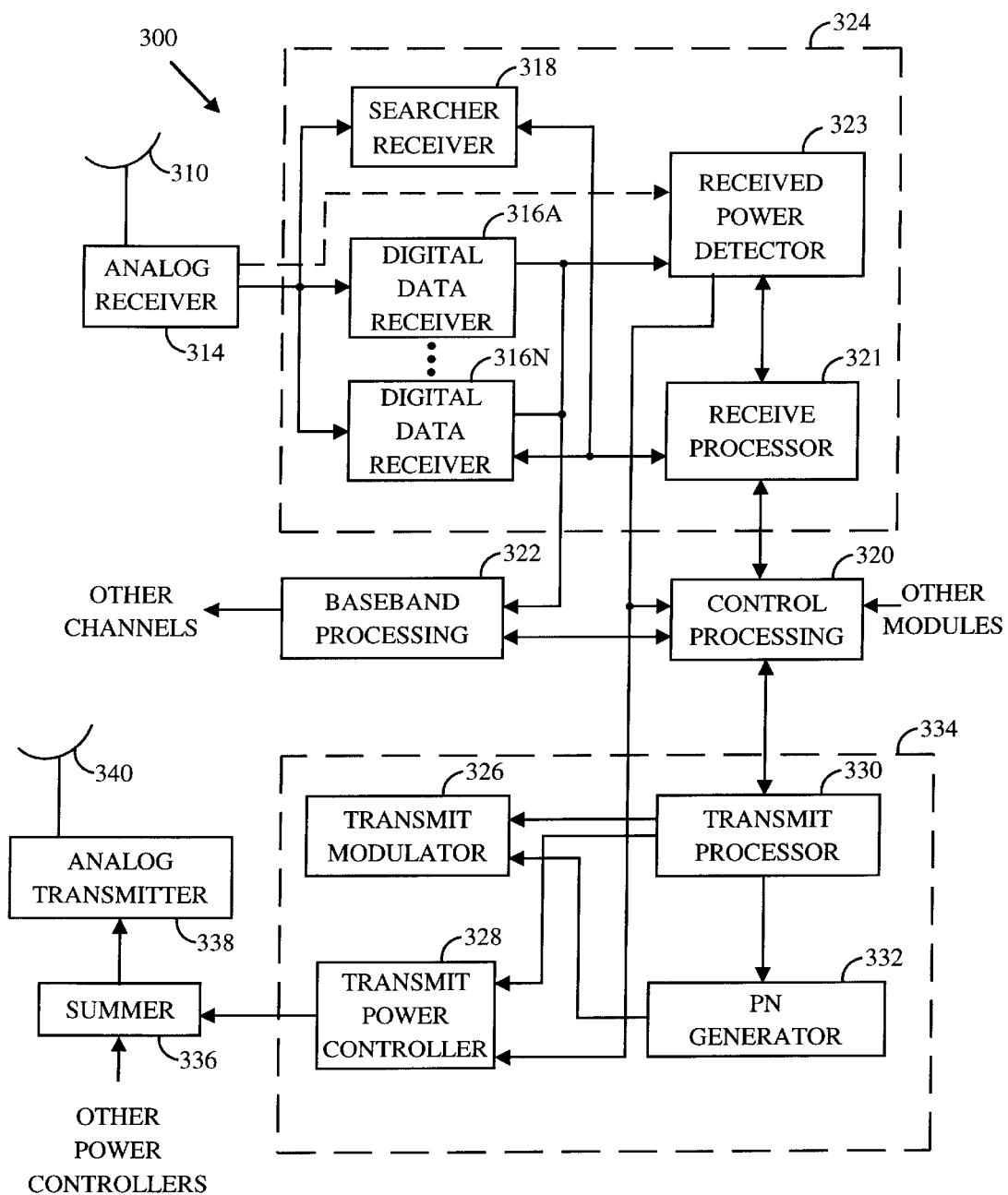
FIG. 3 illustrates an exemplary transmission and reception apparatus for use in a gateway.

An exemplary transmission and reception apparatus 300 for use in gateways 120 and 122 is illustrated in FIG. 3. The portion of gateway 120, 122 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 120, 122 and one mobile unit 124, 126, although certain variations are known in the art. One analog receiver 314 can provide inputs for many digital receiver modules 324, and a number of such modules are typically used in gateways 120, 122 to accommodate all of the satellite beams and possible diversity mode signals being handled at any given time. Each digital receiver module 324 has one or more digital data receivers 316 and a searcher receiver 318. Searcher receiver 318 generally searches for appropriate diversity modes of signals other than pilot signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each subscriber. Exemplary baseband apparatus also includes interface circuits for providing output data, typically to a digital switch or network.

On the input side, a variety of other known elements such as, but not limited to, vocoders, data modems, and digital data switching and storage components may form a part of baseband processing elements 322. These elements operate to process, control, or direct the transfer of voice and data signals to one or more transmit modules 334.

Signals to be transmitted to mobile units are each coupled to one or more appropriate transmit modules 334. A typical gateway uses a number of such transmit modules 334 to provide service to many mobile units 124, 126 at a time, and for several satellites and beams at a time. The number of transmit modules 334 used by gateway 120, 122 is determined by factors well known in the art, including system complexity, number of satellites in view, subscriber capacity, degree of diversity chosen, and the like.

Each transmit module 334 includes a transmit modulator 326 which spread spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. At least one PN generator 332 is used by transmit modulator 326 in spreading the signals. This code generation can also form a functional part of one or more control processors or storage elements used in gateway 120, 124.

The output of transmit power controller 328 is transferred to a summer 336 where it is summed with the outputs from other transmit power control circuits. Those outputs are signals for transmission to other mobile units 124, 126 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to mobile units 124, 126. Antennas 310 and 340 may be the same antennas depending on the complexity and configuration of the system.

As in the case of mobile unit 200, one or more precorrection elements or precorrectors (not shown) can be disposed in the transmission path to adjust the output frequency based on known Doppler for the link through which communication is established. Techniques or elements used to adjust the frequency of signals prior to transmission are well known in the art. In addition, the same or another precorrector can operate to adjust the output timing based on known propagation delay and code Doppler for the link through which communication is established. Techniques or elements used to adjust the timing of signals prior to transmission are also well known in the art.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers for use in subscriber communications.

Control processor 320 also controls the generation and power of pilot, synchronization, and paging channel signals and their coupling to transmit power controller 328. The pilot channel is simply a signal that is not modulated by data, and may use a repetitive unchanging pattern or non-varying frame structure type input to transmit modulator 326, effectively transmitting only the PN spreading codes applied from PN generator 332.

While control processor 320 can be coupled directly to the elements of a module, such as transmit module 334 or receive module 324, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner a single control processor 320 can control the operations of a large number of modules and resources more efficiently. Transmit processor 330 controls generation of, and signal power for, pilot, synchronization, paging signals, and traffic channel signals, and their respective coupling to power controller 328. Receiver processor 321 controls searching, PN spreading codes for demodulation and monitoring received power.

As discussed above for the user terminal, a received power detector 323 can be used to detect the power in the signal as determined by the analog receiver 314, or by monitoring the energy in the outputs of digital receivers 316. This information is provided to transmit power controller 328 to adjust the output power as part of a power control loop as is discussed in further detail below. This information can also be provided to receiver processor 321 or control processor 320 as desired. This information can also incorporated as a function in receive processor 321.

For certain operations, such as shared resource power control, gateways 120 and 122 receive information such as received signal strength, frequency measurements, or other received signal parameters from mobile units in communication signals. This information can be derived from the demodulated outputs of data receivers 316 by receive processors 321. Alternatively, this information can be detected as occurring at predefined locations in the signals being monitored by control processor 320, or receive processors 321, and transferred to control processor 320. Control processor 320 may use this information to control the timing and frequency, as well as output power, of signals being transmitted and processed using transmit power controllers 328 and analog transmitter 338.

During communication system 100 operation, a communication signal s(t), referred to as a forward link signal, is transmitted by a gateway (120, 122) to a mobile unit (124, 126) using a gateway generated carrier 30 frequency of $A_0$. The forward link signal experiences time delays, a propagation delay, frequency shifts due to Doppler, and other effects. The forward link signal experiences these effects first, while transmitting from a gateway to the satellites (i.e., on an uplink portion of the forward link signal), and second, when transmitting from satellites to mobile units (i.e., on a downlink portion of the forward link signal). Once the signal is received, there is a further delay in sending a return or reverse link signal, a propagation delay, and Doppler in the transmit from the mobile unit to the satellite (i.e., on an uplink portion of the reverse link signal) and again from the satellite to the gateway (i.e., on a downlink portion of the reverse link signal).

Figure 4:
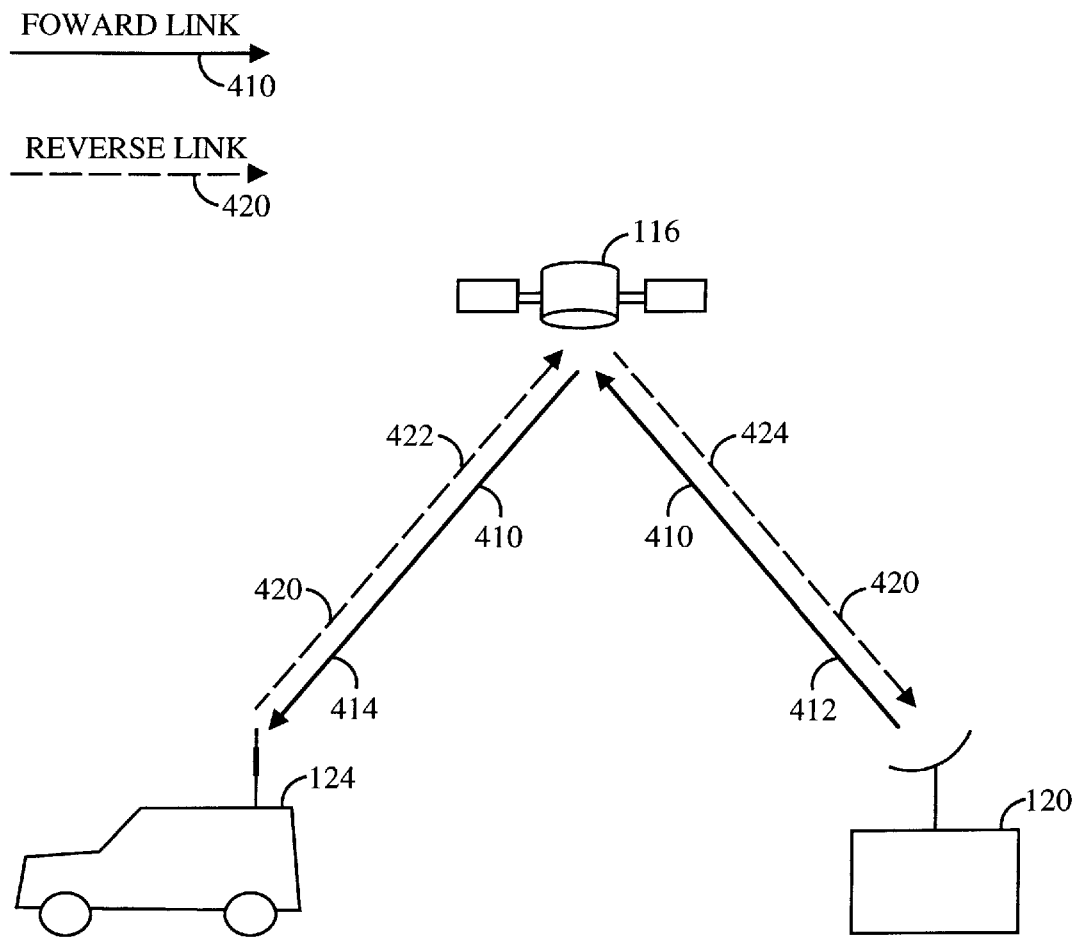
FIG. 4 illustrates a forward link and a reverse link transmission between a gateway and a mobile user.

FIG. 4 illustrates the various signals transmitted in communication system 100 employing one or more satellite repeaters 116. Gateway 120 transmits a forward link signal 410 to mobile unit 124 via satellite repeater 116. Forward link signal 410 is comprised of an uplink portion 412 from gateway 120 to satellite repeater 116 and a downlink portion 414 from satellite repeater 116 to mobile unit 124. Mobile unit 124 transmits a reverse link signal 420 to gateway 120 via satellite repeater 116. Reverse link signal 420 is comprised of an uplink portion 422 from mobile unit 124 to satellite repeater 116 and a downlink portion 424 from satellite repeater 116 to gateway 120.

Figure 5:
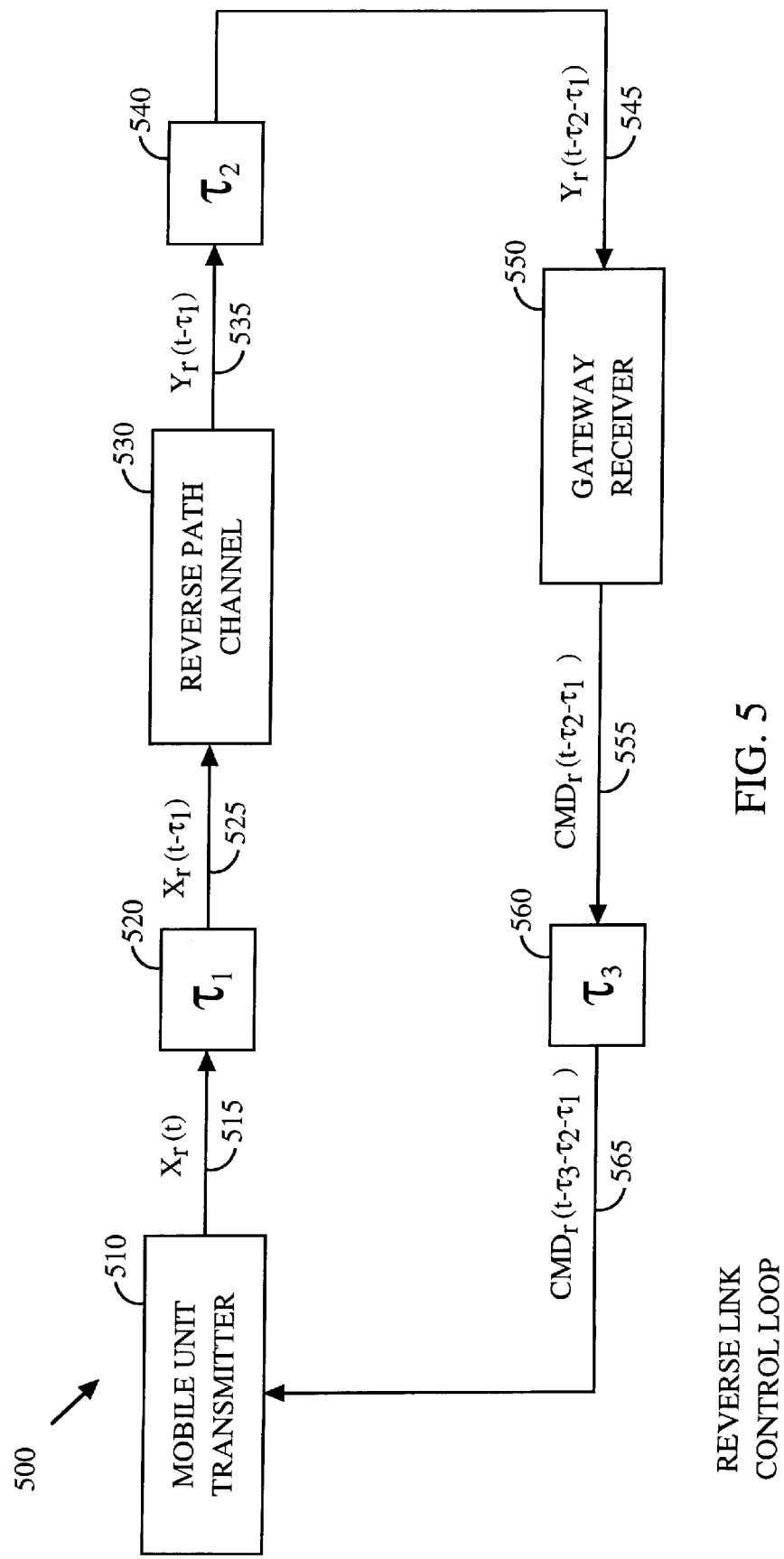
FIG. 5 illustrates a reverse link control loop.

FIG. 5 shows a reverse link control loop 500. Reverse link control loop 500 is useful for controlling a parameter associated with communication system 100, and preferably, for controlling a power level of signals transmitted in communication system 100. Reverse link control loop 500 includes a mobile unit transmitter 510, a first delay block 520, a reverse path channel process 530, a second delay block 540, a gateway receiver 550, and third delay block 560. In one embodiment of the present invention, mobile unit transmitter 510 includes the power control loop functions in transceiver 200, particularly those of control processor 220 and digital transmit power controller 228, as shown in FIG. 2. Further, with respect to this embodiment of the present invention, gateway receiver 550 includes the power control loop functions in receive module 324, control processor 320, and transmit module 334, as shown in FIG. 3.

Figure 6:
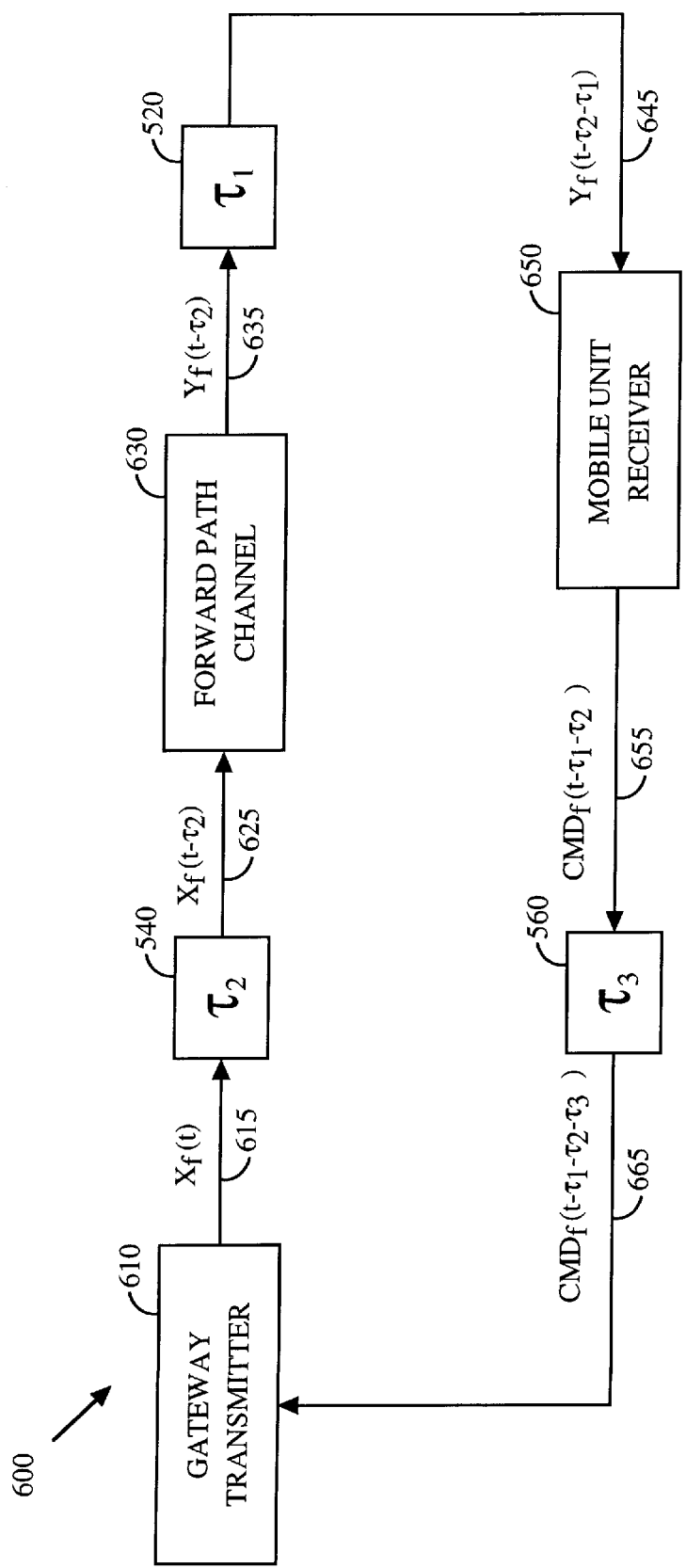
FIG. 6 illustrates a forward link control loop.

FIG. 6 shows a forward link control loop 600. Forward link control loop 600 is useful for controlling a parameter associated with communication system 100, and preferably, for controlling a power level of signals transmitted in communication system 100. Forward link control loop 600 includes a gateway transmitter 610, second delay block 540, a forward path channel process 630, first delay block 520, a mobile unit receiver 650, and a third delay block 560. In one embodiment of the present invention, gateway transmitter 610 includes the power control loop functions in transmit module 334, particularly those of transmit processor 330 and transmit power controller 328, and control processor 320, as shown in FIG. 3. Further, with respect to this embodiment of the present invention, mobile unit receiver 650 includes the power control loop functions in transceiver 200, particularly those of control processor 220, as shown in FIG. 2.

The operation of reverse link control loop 500 will now be discussed primarily with reference to FIG. 5, and secondarily with respect to FIG. 4. Mobile unit transmitter 510 outputs a signal 515 (shown as $x_r(t_1)$ in FIG. 5) at a particular transmit power level. In a preferred embodiment of the present invention, signal 515 represents uplink portion 422 of reverse link signal 420 from mobile unit 124 to gateway 120. Signal 515 experiences a delay through delay block 520 of $\rho_1$. As a result of delay block 520, signal 515 is transformed into a signal 525 (shown as $x_r(t-\tau_1)$ in FIG. 5). Signal 525 corresponds to signal 515 delayed in time by $\tau_1$.

Signal 525 is received by reverse path channel process 530. Reverse path channel process 530 represents attenuation and other effects such as fading, as signal 525 is propagated from mobile unit 124 to gateway 120. In other words, reverse path channel process 530 represents the transfer function of the atmosphere/environment through which signal 525 passes as it propagates from mobile unit 124 to gateway 120 via satellite 116. A signal 535 (shown as $y_r(t-t_1)$ in FIG. 5) results from process 530. Signal 535 represents attenuated and faded signal 525 as would be apparent.

Next, signal 535 is delayed by second delay block 540. Signal 535 experiences a delay through second delay block 540 of $t_2$. As a result of second delay block 540, signal 535 is transformed into a signal 545 (shown as $y_r(t-\tau_1-\tau_2)$ in FIG. 5). Signal 545 corresponds to signal 535 delayed in time by $\tau_2$. The delay $t_2$ represents the propagation delay of downlink portion 424 of reverse link signal 420 as discussed above.

Signal 545 represents the signal received by gateway 120 as transmitted from mobile unit 124. In particular, signal 545 represents the signal transmitted by mobile unit 124 after it has been delayed by $\tau_1$ and $\tau_2$, and attenuated and faded according to process 530.

Gateway receiver 550 receives signal 545 and determines a power level of signal 545 according to well-known methods. As discussed above, it is desirable that the power level of signal 545 match a minimum desired power level. For example, if the power level of signal 545 is less than the desired power level, then gateway receiver 550 issues a power control command that instructs mobile unit transmitter 510 to increase the transmit power of signal 515. On the other hand, if the power level of signal 545 is greater than the desired power level, then gateway receiver 550 issues a power control command that instructs mobile unit transmitter 510 to reduce the transmit power level of signal 515.

In a preferred embodiment of the present invention, gateway receiver 550 issues a single-bit power control command. In other words, gateway receiver 550 either issues a power-up command or a power-down command. A general discussion of such a power control system is disclosed in U.S. Pat. No. 5,396,516, which issued Mar. 7, 1995, entitled "Method And Apparatus For The Dynamic Modification Of Control Parameters In A Transmitter Power Control System," which is assigned to the assignee of the present invention, and incorporated herein by reference. In a preferred embodiment of the present invention, a power-up command instructs mobile unit transmitter 510 to increase the transmit power of signal 515 by a fixed amount, e.g., 1 dB. A power-down command instructs mobile unit transmitter 510 to decrease the transmit power of signal 515 by a fixed amount, e.g., 1 dB. As would be apparent, a different fixed amount of adjustment may be used. As would also be apparent, more bits of power control commands could be implemented which would provide varying levels of power control adjustments.

Furthermore, in a preferred embodiment of the present invention, gateway receiver 550 issues a power-up command when the power level of signal 545 is less than a desired power level. At all other times, gateway receiver 550 issues a power-down command. As would be apparent, additional levels could be implemented that would provide for a zero power command when the received power level of signal 545 is within a specific range of desired power levels.

In another embodiment of the present invention, a power-up command would increase the power level of signal 515 by a first fixed amount and a power-down command would decrease the power level of signal 515 by a second fixed amount, where the first fixed amount is less than the second fixed amount. In this embodiment, reverse link control loop 500 would reduce the power level of signal 515 much quicker than it would increase the power level of signal 515. This embodiment responds quicker to reduce the power levels of signals in the CDMA communication system, which, as discussed above, reduces an amount of interference any one particular signal experiences.

Forward link control loop 600 in FIG. 6 operates in a manner similar to reverse link control loop 500 in FIG. 5. Forward link control loop 600 experiences similar propagation delays between sending power control commands 655 and detecting the responses to those power control commands 655 as signal 645. In particular, forward link control loop 600 experiences propagation delays of $\tau_1+\tau_2+\tau_3$. Based on the discussion provided above with respect to reverse link control loop 500, one skilled in the art would be able understand the operation of forward link control loop 600. Thus, the operation of forward link control loop 600 is not discussed in further detail.

The present invention provides a solution that can be used by itself or in conjunction with a solution provided by "*Method And Apparatus For Predictive Parameter Control With Loop Delay*," having application Ser. No. 08/908,528, filed concurrently herewith, which is assigned to the assignee of the present invention, and incorporated herein by reference. In particular, one embodiment of the present invention uses measurements (e.g., power level of a received signal) obtained from reverse link control loop 500 to adjust a forward link loop gain associated with forward link control loop 600 and/or measurements obtained from forward link control loop 600 to adjust a reverse link loop gain associated with reverse link control loop 500.

As described above, using different frequency bands has significant implications for power control. Specifically, using different frequency bands causes atmospheric or environmental effects, such as fading, to be loosely correlated between the bands. When diffuse scatterers cause the multipath fading, the phasing of multiple reflections will produce independent results at the two different frequencies. However, impacts on the specular component (the direct line of sight component) will tend to have somewhat correlated results. In other words, if mobile unit transmitter 510 were to move behind a block wall which obfuscated the direct line of sight, then the signals associated with each forward link 410 and reverse link 420, and hence the two transmit frequencies, would be attenuated by the block wall roughly at the same time. However, the diffuse scatterers would still provide independent reflections to comprise the total signal. The primary effect of this phenomenon is to have independence between the rapid fluctuations in the forward path channel process 630 and reverse path channel process 530 with some correlation in the slow fading process generally associated with the direct line of sight component.

Thus, when the direct line of sight between mobile unit transmitter 510 and satellite 116 is clear, the fading process for both forward path channel process 630 and reverse path channel process 530 will be Rician with a fairly high K factor. When the direct line of sight is obfuscated by vegetation, such as a tree, then the attenuation of the direct line of sight component will induce a Rician fading process with a lower K factor on both channels 530, 630. Finally, when the direct line of sight is blocked by a solid object, the fading process becomes Rayleigh on both channels 530, 630.

Figure 7:
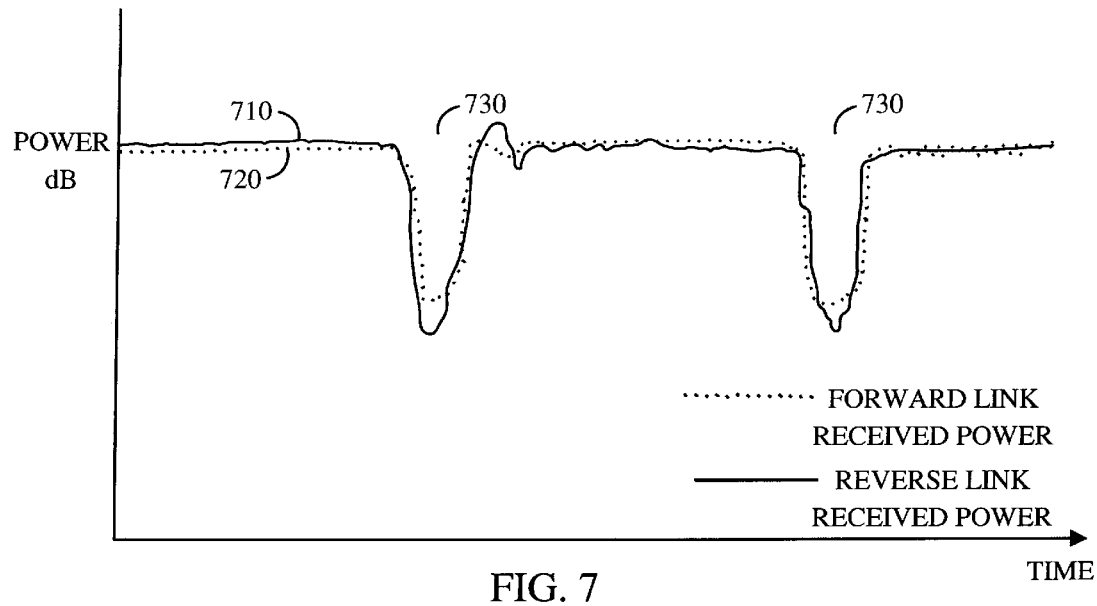
FIG. 7 is a plot illustrating an exemplary comparison between received power levels on the forward and reverse links when the forward and reverse path processes are correlated.
Figure 8:
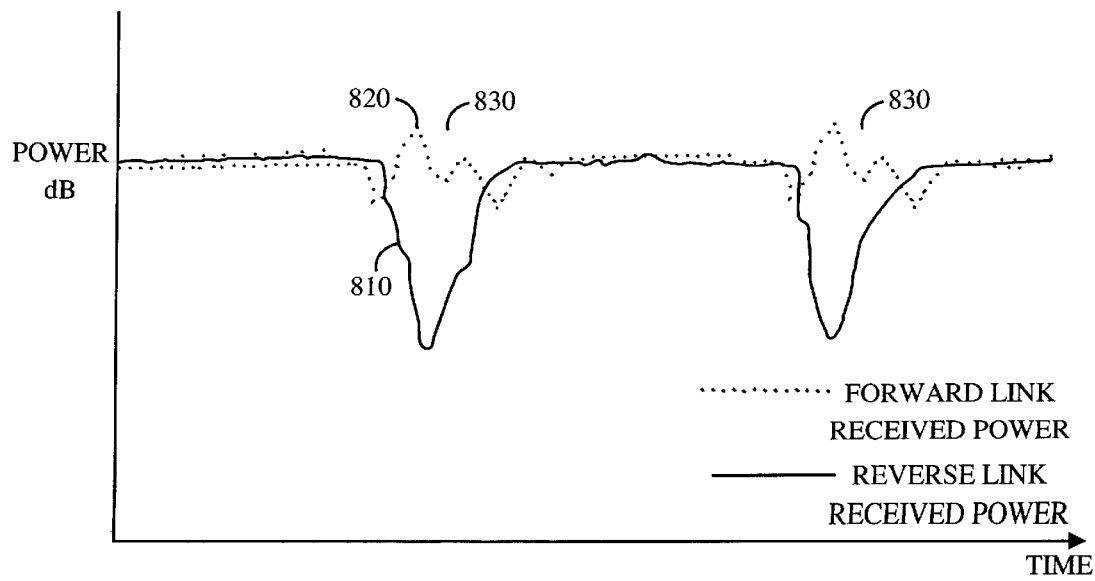
FIG. 8 is a plot illustrating a comparison between received power levels on the forward and reverse links when the forward and reverse path processes are only partially correlated.

FIG. 7 illustrates how frequency diversity effects a parameter, specifically, power level, between processes that are highly correlated. FIG. 8 illustrates how frequency diversity effects the same parameter between processes that are poorly correlated. In FIG. 7, the rapid fluctuations are shown to be independent between the two channel processes 530, 630, with a highly correlated attenuation of the direct line of sight component. This channel effect is consistent with the channel effects of mobile user 124 moving behind a building which blocks the direct line of sight for both channel processes 530, 630. A forward link received power 710 represents a power level of signal 645 received at mobile unit receiver 650. A reverse link received power 720 represents a power level of signal 545 received at gateway receiver 550. Because the effect of moving behind a building is correlated for the direct line of sight component, received powers 710, 720 exhibit similar losses through effects 730 (e.g., fades).

In FIG. 8, the process demonstrates dissimilar characteristics during the fading process. This can be associated with mobile user 124 moving behind a structure that has relatively small features. A person skilled in the relevant art will recognize that the amount of attenuation to the direct line of sight component caused by an obstruction is associated with the amount of the first few Fresnel zones that are blocked by the object. The size of the Fresnel zones are inversely proportional to the transmit frequency. Thus, a structure can block a significant portion of the first Fresnel zone at the higher frequency. Due to the larger size of the Fresnel zones at the lower frequency, that same structure may not block a significant amount at that frequency. Thus, the power levels received at gateway receiver 550 and mobile unit receiver 650 may more closely resemble those shown in FIG. 8. Specifically, a forward link received power 820 represents a power level of signal 645 received by mobile unit receiver 650. A reverse link received power 810 represents a power level of signal 545 received by gateway receiver 550. In this case, because channel processes 530, 630 are not highly correlated, received powers 810, 820 do not exhibit similar losses through effect 830 to enable measurements obtained in forward link control loop 600 to be used directly in reverse link control loop 500, or vice versa.

However, the present invention does not rely on the degree to which received powers 810, 820 exhibit the same loss. Rather, the present invention relies on the fact that if an effect, such as fading, is present in forward link 410, that effect is also very likely to be present in reverse link 420. The present invention detects a change in a state of a signal propagating through processes 530, 630 in one of the control loops to adjust a loop gain used to change the power level transmitted in the other control loop. More precisely, if gateway receiver 550 detects a change in the "propagation state" of signal 545 in reverse link control loop 500, then gateway transmitter 610 will adjust the step size of control command 665 used to change the power level of signal 615 transmitted by gateway transmitter 610 in forward link control loop 600. Similarly, if mobile unit receiver 650 detects a change in the propagation state of signal 645 in forward link control loop 600, then mobile unit transmitter 510 will adjust the step size of control command 565 used to change the power level of signal 515 transmitted by mobile unit transmitter 510 in reverse link control loop 500. In a preferred embodiment of the present invention, a change in propagation state is detected by monitoring the power level of the signal as will be discussed in further detail below.

The following description is provided with reference to only reverse link control loop 500 for reasons of clarity and brevity. It would be apparent that this description applies to forward link control loop 600 as well. In one embodiment of the present invention, increasing the step size of control command 565 is accomplished by means of a loop gain. In this embodiment, the loop gain is used to multiply the step size of control command 565 before control command 565 is used to adjust the transmit power level of signal 515. For example, if mobile unit receiver 650 detects a change in the propagation state of signal 645, then mobile unit transmitter 510 adjusts the loop gain by a predetermined factor (e.g., 2). Then mobile unit transmitter 510 multiplies control command 565 by the adjusted loop gain thereby increasing the effective step size of control command 565.

Figure 9:
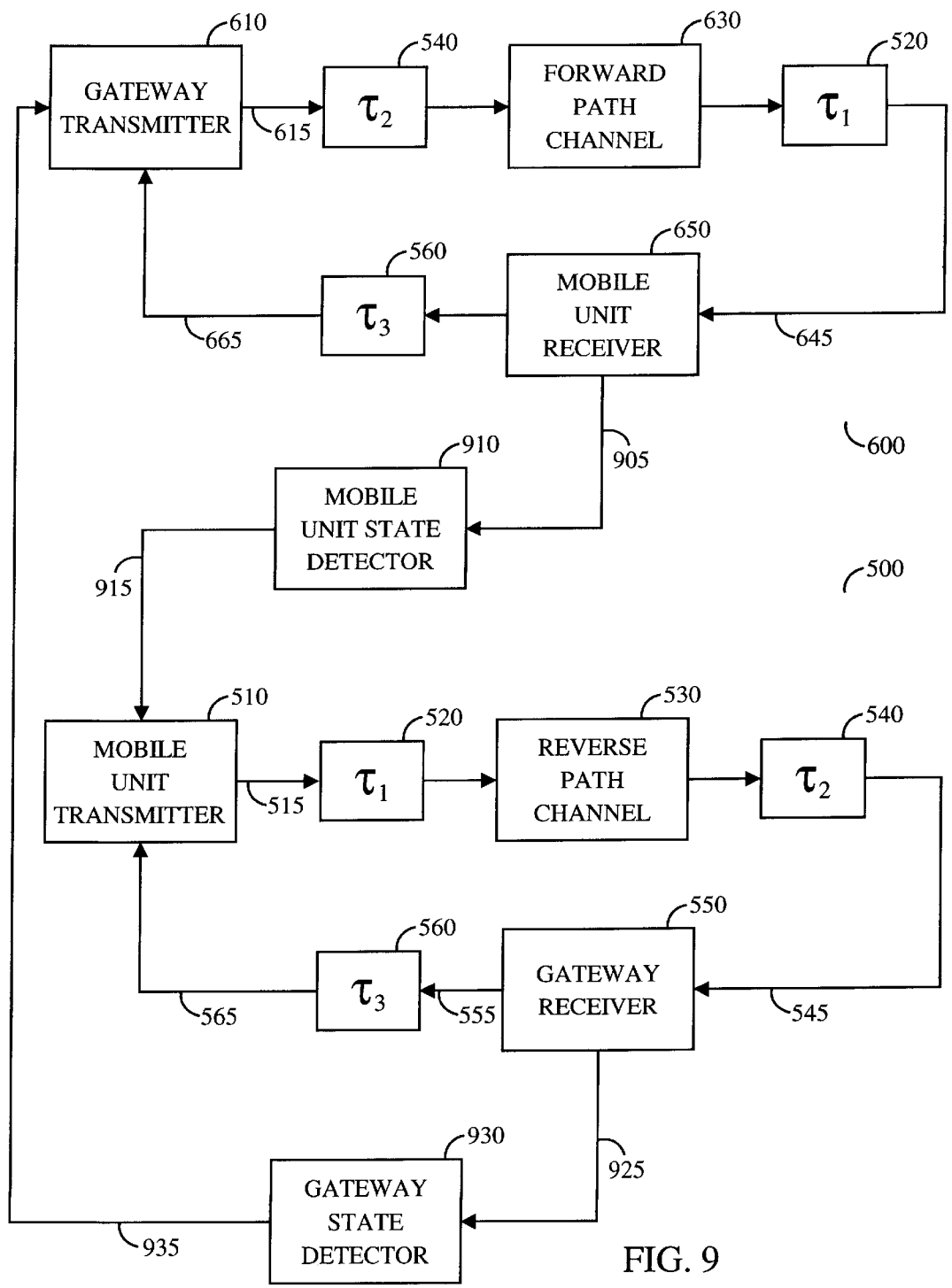
FIG. 9 illustrates forward and reverse link control loops that use state detectors according to one embodiment of the present invention.

FIG. 9 illustrates forward and reverse link control loops 600, 500 according to one embodiment of the present invention. In particular, FIG. 9 illustrates mobile unit receiver 650 in forward link control loop 600 coupled to mobile unit transmitter 510 in reverse link control loop 500 via a mobile unit state detector 910, and gateway receiver 550 in reverse link control loop 500 coupled to gateway transmitter 610 in forward link control loop 600 via a gateway state detector 930.

In general, mobile unit state detector 910 receives a power measurement 905 of signal 645 received by mobile unit receiver 650. Based on one or more power measurements 905, mobile unit state detector 910 determines whether forward path channel process 630 is operating in a quiescent state or an active state. Based on this determination, mobile unit state detector 910 outputs a forward control loop gain 915 to be applied to control command 565 to thereby adjust an amount of change in the power level of signal 515 transmitted by mobile unit transmitter 510.

Similarly, gateway state detector 930 receives a power measurement 925 of signal 545 received by gateway receiver 550. Based on one or more power measurements 925, gateway state detector 930 determines whether reverse path channel process 530 is operating in a quiescent state or an active state. Based on this determination, gateway state detector 930 outputs a reverse control loop gain 935 to be applied to control command 665 to thereby adjust an amount of change in the power level of signal 615 transmitted by gateway transmitter 610.

Based on the assumption that reverse path channel process 530 and forward path channel process 630 transition similarly between the quiescent state and the active state, state detectors 910, 930 of the present invention permit control loops 500,700 to respond to effects 830 (such as fades, etc.) much more rapidly than control loops 500, 600 operating without state detectors 910, 930. This is discussed in further detail below.

The quiescent state and the active state referred to above are also referred to collectively as propagation states (i.e., how the signals are propagating through processes 530, 630). The quiescent propagation state corresponds to a situation where processes 530, 630 represent direct line-of-sight transmissions between gateway 120 and satellite 118 and between mobile unit 124 and satellite 118. The active propagation state corresponds to situations where processes 530, 630 do not have a strong direct line-of-sight transmission component between gateway 120 and satellite 118 and/or between mobile unit 124 and satellite 916. As discussed above, when the direct line-of-sight component is attenuated, fading occurs. This results in sharp changes in the received signal power levels for which the present invention compensates.

Figure 10:
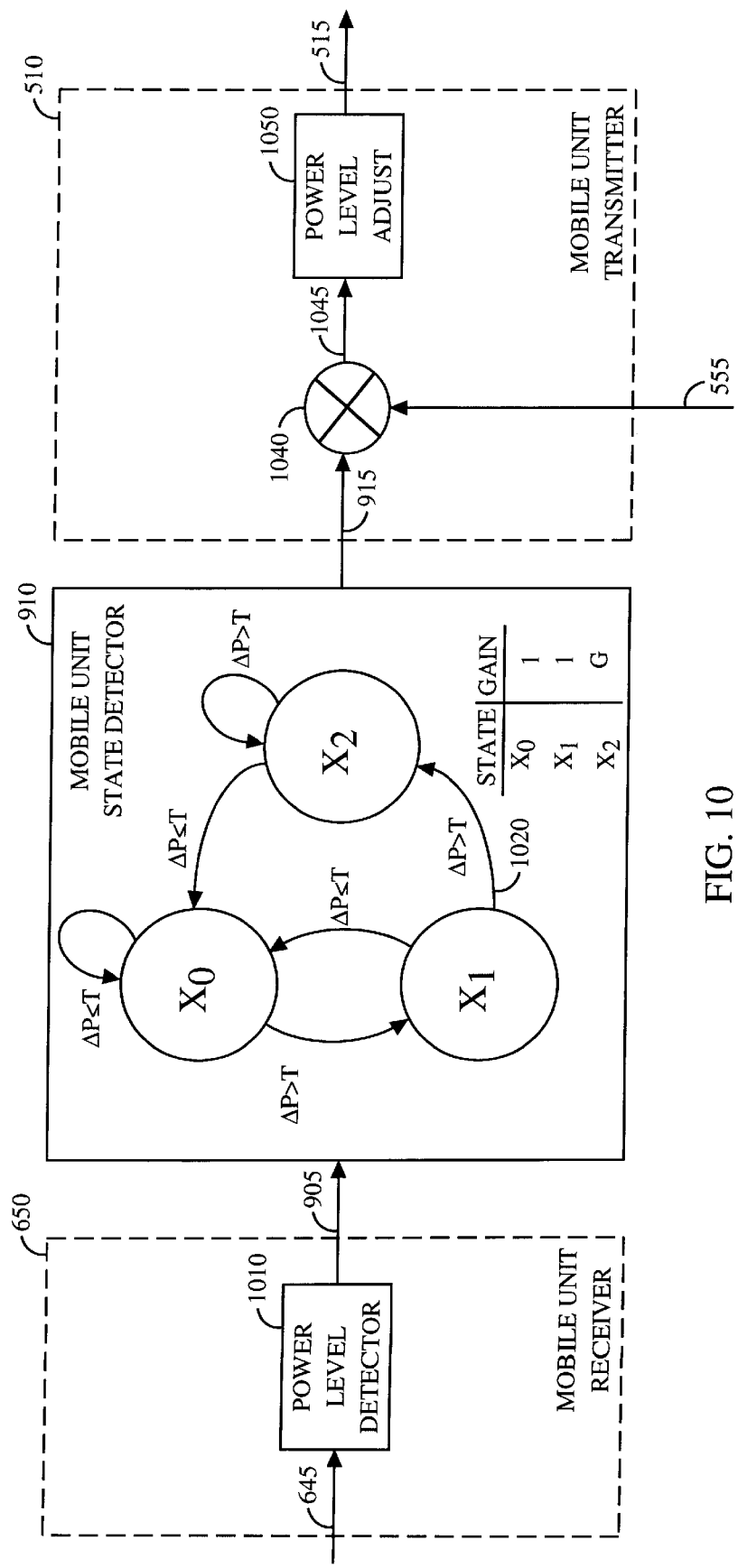
FIG. 10 illustrates a state detector as used with the reverse link control loop in further detail.

The present invention is now discussed with respect to FIG. 10. FIG. 10 illustrates mobile unit state detector 910 as well as relevant portions of mobile unit receiver 650 and mobile unit transmitter 510 in further detail. While the following discussion is directed specifically to reverse control loop 500 and mobile unit state detector 910, it would be apparent how the discussion applies to forward control loop 600 and gateway state detector 930 as well.

Mobile unit receiver 650 includes a power level detector 1010. Power level detector 1010 includes those components in mobile unit receiver 650 that enable mobile unit receiver 650 to determine a power level of received signal 645 according to well known techniques as would be apparent. Power level detector 1010 outputs a power level of received signal 645 to state detector 910.

In general, state detector 910 determines the state of reverse path channel process 530. In a preferred embodiment of the present invention, state detector 910 determines whether reverse path channel process 530 is operating in a quiescent state (i.e., steady state) or an active state (i.e., changing state). Based on the state of reverse path channel process 530, state detector 910 outputs a gain 915 to mobile unit transmitter 510. Gain 915 is used to adjust the loop gain used to change the transmit power of signal 515. If reverse path channel process 530 is operating in the quiescent state, state detector 910 outputs unity gain for gain 915 (i.e., the step size for control command 565 remains at a default or predetermined level). If reverse path channel process 530 is operating in the active state, state detector 910 outputs a gain, G, for gain 915 (i.e., the step size for control command 565 is increased by a factor of G). In a preferred embodiment of the present invention, G is set at 2. Thus, in a preferred embodiment of the present invention, state detector 910 directs mobile unit transmitter 510 to increase the step size of control command 565 by a factor of 2 when operating in the active state. As would be apparent, other values of G can be used depending on system parameters, such as step size, time delays, expected power fades, etc. Furthermore, as would also be apparent, a variable G could also be used depending on, for example, the magnitude of change in the power level of transmitted signal 515 or other system measurements.

Mobile unit transmitter 510 receives gain 915 from state detector 910 and control command 565 from gateway receiver 550. Mobile unit transmitter 510 applies gain 915 to control command 565 to obtain an adjusted control command 1045. In a preferred embodiment of the present invention, mobile unit transmitter 510 multiplies control command 565 by gain 915 via a multiplier 1040 to obtain an adjusted control command 1045. Other embodiments of the present invention use product forming logic or similar devices and techniques to accomplish the same task.

Adjusted control command 1045 is received by a power level adjust 1050 in mobile unit transmitter 510. Power level adjust 1050 includes those components in transmit power controller 328 that enable mobile unit transmitter 510 to adjust the power level of transmitted signal 515 according to well known techniques as would be apparent.

FIG. 10 further illustrates one embodiment of state detector 910 of the present invention. In particular, FIG. 10 illustrates state detector 910 operating according to a state diagram 1020. State diagram 1020 includes three states: state $X_0$, state $X_1$, and state $X_2$. State detector 910 is initialized to state $X_0$ at startup. In this embodiment of the present invention, transitions between the states are based on a change in power level measurement 905 (also shown in FIG. 10 as $\Delta P$). Specifically, in this embodiment of the present invention, transitions between the quiescent state and the active state occur based on whether two consecutive changes in power level measurements 905 each exceed a predetermined threshold (shown in FIG. 10 as T).

Beginning at state $X_0$, if the change in power level measurement 905 exceeds the predetermined threshold, state detector 910 transitions from state $X_0$ to state $X_1$. If the change in power level measurement 905 does not exceed the predetermined threshold, state detector 910 remains in state $X_0$ and remains there until the predetermined threshold is exceeded.

From state $X_1$, if the change in power level measurement 905 exceeds the predetermined threshold, state detector 910 transitions from state $X_1$ to state $X_2$. If the change in power level measurement 905 does not exceed the predetermined threshold, state detector 910 transitions back to state $X_0$.

From state $X_2$, as long as the change in power level measurement 905 continues to exceed the predetermined threshold, state detector 910 remains in state $X_2$. If the change in power level measurement 905 does not exceed the predetermined threshold, state detector 910 transitions back to state $X_2$.

As long as state detector 910 is either in state $X_0$ or state $X_1$, state detector 910 outputs gain 915 as unity gain. According to this embodiment of the present invention, state $X_0$ and state $X_1$ indicate that reverse path channel process 530 is operating in the quiescent state. In this case, the step size of control commands 565 should not be changed.

When state detector 910 is in state $X_2$, state detector 910 outputs gain 915 as G. According to this embodiment of the present invention, state $X_2$ indicates that reverse path channel process 530 is operating in the active state. In this case, the step size of control commands 565 should be increased by a factor of G.

FIG. 10 illustrates an expression of one embodiment of the present invention. As would be apparent, other expressions of the same embodiment exist (i.e., other than a state diagram). For example, the following pseudocode represents a different expression of a similar embodiment of the present invention:

if$((|(PowerLevel_k - PowerLevel_{k-1})| > Threshold)$ and $(|(PowerLevel_{k-1} - PowerLevel_{k-2})| > Threshold)))$ then Gain=G else Gain=1 where

PowerLevel$_i$ is the $i^{th}$ power level measurement.

As would be apparent, additional numbers of consecutive changes in power level measurements 905 that exceed the predetermined threshold could be used. For example having four consecutive changes in power level measurements 905 exceed the predetermined threshold could be used to indicate a change between the quiescent state and the active state. Other numbers could be used as well.

The predetermined threshold is set based on various system parameters as would be apparent. These parameters include, but are not limited to, propagation delays, loop iteration rate, command step size, and expected changes in power levels, etc.

Figure 11:
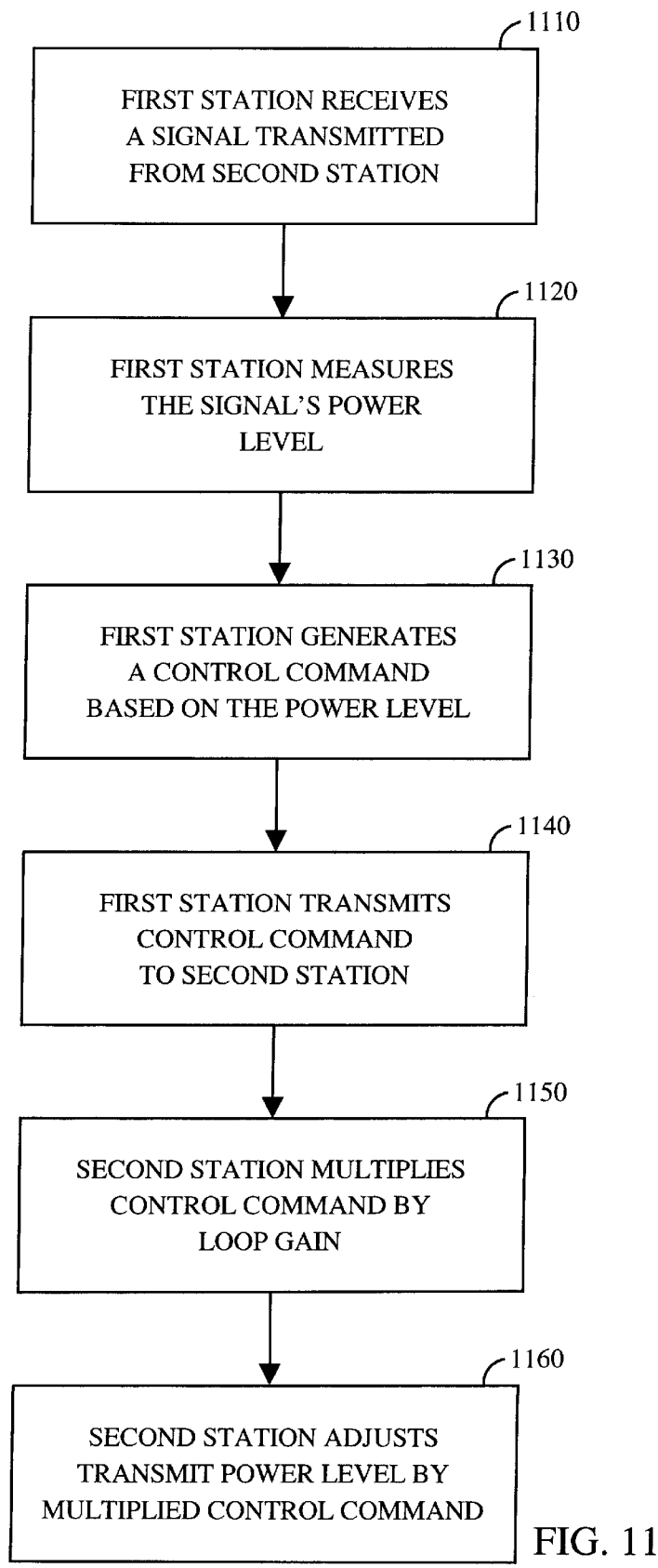
FIG. 11 is a flowchart illustrating the operation of an exemplary control loop using the loop gain of the present invention.
Figure 12:
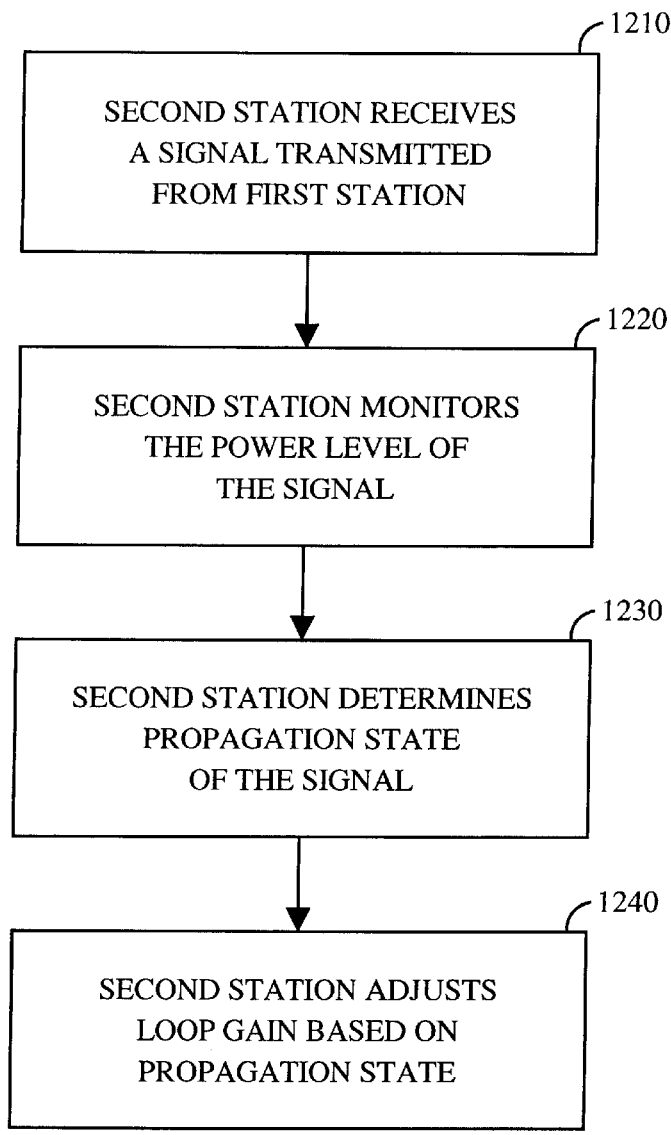
FIG. 12 is a flowchart illustrating the determination of the loop gain according to the present invention.

The present invention is now described in terms of the flow diagrams illustrated in FIG. 11 and FIG. 12. FIG. 11 is a flow diagram illustrating the operation of an exemplary control loop similar to control loops 500, 600. FIG. 12 is a flow diagram illustrating the operation of an exemplary state detector similar to state detectors 910, 930.

Referring now to FIG. 11, in a step 1110, a first station receives a signal transmitted from a second station. The signal received by the first station can be any signal that is sent from the second station to the first station whose power level is desired to be controlled. In a step 1120, the first station measures the power level of the received signal according to well-known techniques. In a step 1130, the first station generates a control command that directs the second station to adjust the power level of the signal transmitted by the second station. As described above, in a preferred embodiment of the present invention, the control command indicates that the power level should be adjusted by a predetermined step size. As would be apparent, other embodiments may use variable step sizes.

In a step 1140, the first station transmits the control command to the second station. In a step 1150, the second station multiplies the received control command by a loop gain factor to determine an adjustment to the power level of the transmitted signal. In a step 1160, the second station adjusts the power level of the transmitted signal by the adjustment determined in step 1150.

Referring now to FIG. 12, in a step 1210, the second station receives a signal transmitted from the first station. This signal is different from the signal described above with reference to FIG. 12. This signal can be any signal transmitted from the first station to the second station whose power level can be effectively monitored. This signal need not be a signal whose power level is desired to be controlled. This signal need only be indicative of the process through which signals are transmitted between the first and second stations.

In a step 1220, the second station monitors the power level of the signal received from the first station. In one embodiment of the present invention, the second station measures the power level of the received signal. In another embodiment of the present invention, the second station compares the signal against one or more thresholds. In a preferred embodiment of the present, the second station measures the power level of the received signal and determines changes in the power level between subsequent samples of the signal. Other embodiments may use other techniques to monitor the power level of the received signal as would be apparent.

In a step 1230, the second station determines a propagation state associated with the received signal based on the monitored power level. In other words, the second station determines whether the process through which the signal was transmitted is operating in a quiescent state or an active state as discussed above.

In a step 1240, the second station adjusts the loop gain based on the propagation state determined in step 1230. As discussed above, if the propagation state is the quiescent state, the loop gain is set at unity. If the propagation state is the active state, the loop gain is set at a gain factor greater than one. In a preferred embodiment, the gain factor is set at 2. Other gain factors could be used as would be apparent, including non-integer gain factors.

Figure 13:
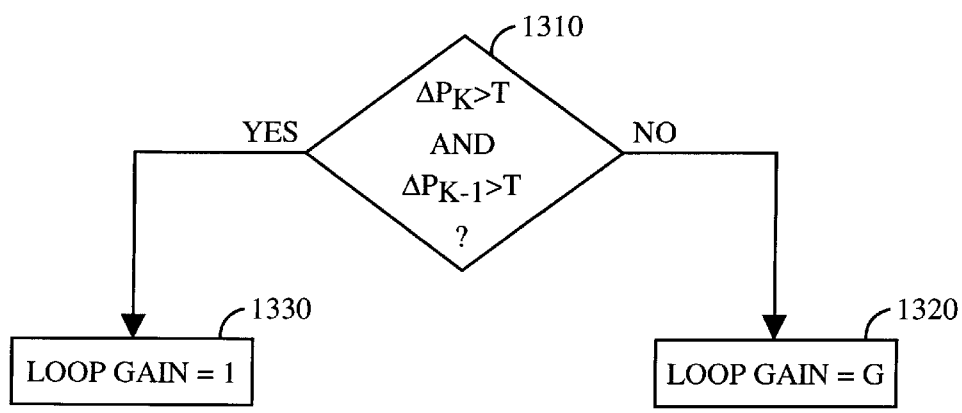
FIG. 13 is a flowchart illustrating, in further detail, the determination of a propagation state according to one embodiment of the present invention.

FIG. 13 is a flow diagram, according to a preferred embodiment of the present invention, illustrating the operation of step 1230 in further detail. In a decision step 1310, the second station determines if a change in the power level of the received signal exceeds a threshold and if the previous change in the power level of the received signal exceeds the threshold. In other words, the second station determines whether the change in power level exceeded the threshold on two consecutive occasions. In particular, the second station determines whether the magnitude of the change exceeds the threshold (i.e., applies equally to a power level increase or a decrease).

If the change in the power level twice consecutively exceeds the threshold, in a step 1320, the loop gain is set at a non-unity gain factor. If the change in the power level does not twice consecutively exceed the threshold, in a step 1330, the loop gain is set at a unity gain factor.

As would be apparent, various modifications can be made to the operation of step 1230 without departing from the scope of the present invention. Any technique for estimating the propagation state of the channel can be used. For example, a change may require comparing an average of the received powers for the last N samples against an average of the received powers for the last M samples, where M>N. Thus, one might determine that the average signal power has dropped below a threshold. A second embodiment might provide for a different algorithm to determine an increase in loop gain as opposed to a decrease in loop gain. In addition, the present invention contemplates the use of indicators for determining the propagation state of the process through means which include other sources of information or sensors other than those detecting changes in power level.

FIGS. 11, 12, and 13 have been described in terms of a "first station" and "a second station." Though described above as operating in the second station, the present invention can be used at the first station or simultaneously at both the first station and the second station as would be apparent. Furthermore, the present invention can be implemented in terms of gateways 120, mobile units 124, or other such communication system component having a transmitter collocated with a receiver.

As indicated above, the present invention permits control loops 500,600 to respond to effects 830 (such as fades, etc.) much more rapidly, depending on the increase in loop gain, as compared with control loops 500, 600 operating without state detectors 910, 930. As discussed above the response time of control loops 500, 600 is affected by the round-trip propagation time. In other words, the round-trip propagation time elapses between the time when a control command 555 is sent by, for example, gateway receiver 550 and when a response to that control command 555 (i.e., change in the power level of signal 545) is detected by gateway receiver 550.

In addition to responding more quickly, state detectors 910, 930 also affect the rate at which the error between the actual power level and the desired power level is closed. This is referred to as the slew rate. For gain 915 set at G, the slew rate is G times as fast as control command 565 without any gain. Thus, for example, when G=2, the slew rate is twice as fast as the slew rate without any gain, etc. Determining the proper gain is dependent upon factors such as propagation delays, loop iteration rate, size of the command step, and expected change and rate of change in received power levels.

Understanding the effects of forward and reverse channel processes 530, 630 permits a similar determination of a change experienced by signals back and forth between mobile unit 124 and gateway 120. Thus, parameters other than power could be controlled by the present invention. In some communication systems, the same or additional control loops could be used to control other operating parameters of communication signals such as frequency, code timing, and so forth. Commands, such as up and down or advance and retard commands, can then be generated as appropriate, which are used to implement changes in such parameters. For example, mobile unit 124 can be told to adjust the operating frequency for return link signals to counter drift in the center frequency of the local oscillator of mobile unit 124, or code timing could be changed to compensate for Doppler effects, and so forth. Many parameters and processes are well known for which compensation could be effected using commands, but which also suffer from the same time or transfer delays experienced by the power control commands discussed above.

While this invention has been described in terms of a satellite based communication system 100, the present invention could also be implemented in systems not employing satellites. For example, in terrestrial systems, a similar problem with limit cycles might occur if propagation between a cell-site and a mobile unit 124 is large in comparison to the loop iteration time of power control loop 500.

This invention has also been described in terms of a single-bit system wherein a power-up command or a power-down command was issued by receivers 550, 650 instructing transmitters 510, 610 to increase or decrease transmit power by a fixed amount. However, different schemes could be implemented wherein power control command 555, 655 is quantized depending on a difference between desired power level 610 and received power level 545 as would be apparent.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What I claim as my invention is:

1. A method for controlling power in a satellite communications system having a first station, a second station, and a satellite link coupling signals between the first station and the second station, each station having means for transmitting a signal and means for receiving a signal, the method comprising the steps of:

receiving, at the second station, a first signal transmitted from the first station;

receiving, at the first station, a second signal transmitted from the second station;

measuring, at the first station, a power level of said received second signal;

generating, at the first station, a power control command based on said measured power level of said received second signal;

transmitting said power control command from the first station to the second station;

applying, at the second station, a loop gain to said power control command;

adjusting, at the second station, a transmit power level of said second signal transmitted from the second station based on said power control command;

monitoring, at the second station, a power level of said received first signal;

determining a propagation state of said received first signal based on said power level of said received first signal; and adjusting said loop gain factor as a function of said propagation state of said first signal, wherein said loop gain factor is either a power-up factor to increase the gain by a first fixed amount or a power-down factor to decrease the gain by a second fixed amount, where the first fixed amount is less than the second fixed amount.

2. The method of claim 1, wherein said step of determining a propagation state comprises the step of:

determining whether said received first signal is operating in a fade.

3. The method of claim 1, wherein said step of determining a propagation state comprises the steps of:
   determining a power level change between said power levels of said received first signals received at consecutive times;
   comparing said power level change to a threshold; and
   determining said propagation state based on whether said power level change exceeds said threshold.

4. The method of claim 3, wherein said step of determining said propagation state comprises the steps of:
   determining said propagation state as a quiescent state if said power level change does not exceed said threshold; and
   determining said propagation state as an active state if said power level change exceeds said threshold.

5. The method of claim 4, wherein said step of adjusting said loop gain factor comprises the step of:
   setting said loop gain factor to a non-unity gain factor if said propagation state is said active state.

6. The method of claim 4, wherein said step of adjusting said loop gain factor comprises the step of:
   setting said loop gain factor to a unity gain factor if said propagation state is said quiescent state.

7. The method of claim 5, wherein said step of setting said loop gain factor comprises the step of:
   setting said loop gain factor to 2 if said propagation state is said active state.

8. The method of claim 1, wherein the first station is a gateway and the second station is a mobile unit.

9. The method of claim 1, wherein the first station is a mobile unit and the second station is a gateway.

10. An apparatus for controlling a parameter in a communication system comprising:
    a first station having:
       means for transmitting a first signal having the parameter to be controlled, and
       means for receiving a second signal, including means for receiving a control command;
    a second station having:
    means for receiving said first signal, and
       means for transmitting said second signal;
    a control loop having:
       means, located at said second station, for measuring the parameter of said first signal,
       means, located at said second station, for generating said control command based on said measured parameter, and
       means, located at said first station, for adjusting the parameter of said first signal based on said control command and a loop gain; and
    a state detector, located at said first station, having:
       means for determining a propagation state of a process through which said second signal is transmitted from said second station to said first station, and
       means for adjusting said loop gain based on said propagation state, wherein said means for adjusting said loop gain factor is either a power-up factor to increase the gain by a first fixed amount or a power-down factor to decrease the gain by a second fixed amount, where the first fixed amount is less than the second fixed amount.

11. The apparatus of claim 10, wherein said means for determining a propagation state comprises:
    means for monitoring a parameter associated with said second signal, said parameter being of the same nature as the parameter that is to be controlled with respect to said first signal.

12. The apparatus of claim 11, wherein said means for determining a propagation state comprises:
    means for determining whether a change in said parameter associated with said second signal exceeds a threshold.

13. The apparatus of claim 11, wherein said means for determining a propagation state comprises:
    means for determining whether a magnitude of a change in said parameter associated with said second signal exceeds a threshold.

14. The apparatus of claim 13, wherein said means for determining a propagation state further comprises:
    means for determining whether a magnitude of a change in said parameter associated with said second signal exceeds a threshold over a plurality of consecutive periods.

15. The apparatus of claim 14, wherein said means for determining a propagation state further comprises:
    means for determining said propagation state as a quiescent state if said magnitude of said change does not exceed said threshold over said plurality of consecutive periods; and
    means for determining said propagation state as an active state if said magnitude of said change exceeds said threshold over said plurality of consecutive periods.

16. The apparatus of claim 15, wherein said means for adjusting said loop gain comprises:
    means for adjusting said loop gain to a unity gain factor if said propagation state is in said quiescent state; and
    means for adjusting said loop gain to a non-unity gain factor if said propagation state is in said active state.

17. The apparatus of claim 16, wherein said non-unity gain factor is 2.

18. The apparatus of claim 10, wherein the parameter to be controlled is a power level of said first signal.

19. The apparatus of claim 18, wherein said first station is a gateway and wherein said second station is a mobile unit.

20. The apparatus of claim 18, wherein said first station is a mobile unit and wherein said first station is a gateway.

* * * * *